Patented Apr. 6, 1937

2,075,871

UNITED STATES PATENT OFFICE 2,075,871

PROCESS OF TREATING PETROLEUM PRODUCTS

Frank L. Smith, Olean, N. Y., assignor to Socony-Vacuum Oil Company, Incorporated, New York, N. Y., a corporation of New York No Drawing. Application March 7, 1935, Serial No. 9,807

2 Claims. (Cl. 196—41)

This invention is directed to a method of treating petroleum products for the removal of odor and taste.

In the preparation of petrolatums, neutral oils, mineral seal oil, and the like for sale, it is important that the products be freed of offensive odors and tastes. Many of these products are used in the compounding of pharmaceutical specialties and for other purposes where they must be so prepared. Petrolatums are used in ointments and the like, and neutral oils and mineral seal oils are frequently used as ingredients of sprays, insecticides, etc. Even when applied for lubricant use, odor must frequently be removed to make a product of desirable quality.

Present practice for the removal of odors usually consists of prolonged steaming and/or agitation in the presence of soda. These processes are time consuming, with liabilities of deterioration in product color due to prolonged exposure to conditions of treatment, and frequently bring about losses of a high cost product, due to the formation of difficultly broken emulsions and the like. In most cases it is necessary to perform several successive treatments to secure the desired result.

This invention is based upon the discovery that the desired improvement in odor and taste can be effected in products of the kind defined above, by a single treatment thereof with certain kinds of soaps, alone or in combination with soda, without however, requiring the prolonged treatment and consequent disadvantages of the prior practices noted above. The invention therefore is a new process of treating materials of this class to effect the improvements noted above. By the use of this new process, I have been able to materially reduce the amounts of reagents used, the time necessary for treatment, and the loss of high-cost product. At the same time, I have been able to obtain products of better quality and in some cases to successfully treat materials which are exceedingly difficult to treat by any previous method known to me.

Among the treating agents suitable for the purpose is a demulsifying soap of the kind described in United States Patent 1,742,623, issued to Turner, et al. This soap consists of a product obtained by treating neutralized acid sludge from petroleum refining with "white water" from petroleum refining, the method of preparation being more particularly described as water-washing the sludge resulting from treatment of an oil with strong acid, heating the washed sludge with steam, settling and separating the aqueous portion, neutralizing the remaining portion, and treating the neutralized portion with "white water" which is the water that has been used to wash "sour" oil which has been neutralized, as set forth in that patent. This novel reagent may be employed alone or preferably in combination with soda for the removal of odor and taste from petroleum products.

The demulsifying soap may be used either in the form of a water solution prepared from the dehydrated product described in United States Patent #1,742,623, or preferably, the water solution of this soap, as described therein, which solution has been concentrated to a strength of about 6° to 8° Baumé.

As an example of such treatment, I may cite the treatment of petrolatum. This product was treated formerly with a solution of caustic soda, at the rate of one pound of dry soda per barrel of petrolatum and agitated with steam and/or air. The time required was two days per treat, and almost invariably the treat had to be repeated in order to obtain the desired result. The loss of petrolatum incurred was approximately one per cent. With the novel reagent of this invention, used in the proportion of 2 gallons to each barrel of 10° Baumé caustic soda solution, dosing the petrolatum at the same rate of one pound of dry soda per barrel, a petrolatum of superior odor and taste was obtained in a single treatment and the loss cut in half.

Neutral oils were previously treated with ½ pound of dry soda per barrel, and the treatment took 3 days. There were serious difficulties with emulsions, and the prolonged treatment seriously raised and set the color so that filtering was more difficult and costly. By using the combination of demulsifying soap and caustic soda solution above noted, the amount of reagent was reduced to ¼ pound of dry soda per barrel of oil, the treatment was completed in only two days, the product was of better quality, and 25 points Lovibond less increase in color of the treated oil was had. The reduction in loss was from 0.5% to 0.2% in the treatment step, with a further substantial increase in final recovery of finished oil due to the necessity for less rigorous filtration to adjust the color of the treated oil to the final standard.

In a similar manner, by the use of this reagent, I have been able to completely remove the distillate odor from mineral seal oil to be used in the compounding of insecticides. I am not aware of any prior process capable of removing this odor to an equivalent degree, and it has formerly been the practice to mask the odor with perfume, which I now find to be unnecessary.

In making use of this novel reagent I prefer to use it in admixture with solutions of caustic soda, ranging in strength from a weak solution of 3° Baumé, to about 10° Baumé. The weaker solutions are used on the light, light colored oils, as I have found that these solutions deodorize in a satisfactory manner and are not sufficiently strong to darken the color of the oil treated. With heavier oils of darker color, caustic solution of increasing strength may be used, and when treating petrolatums and waxes, I find it preferable to use the 10° Baumé caustic solution, since weaker solutions are frequently incapable of completely removing objectionable tastes in the product. I prefer to use a soap which as originally produced in accordance with the above-quoted patent, #1,742,623, has a gravity of not more than 6° Baumé, to 8° Baumé, since with more concentrated soap, I find that the soap is apparently not free from color bodies or similar deleterious bodies, since stronger soaps are liable to discolor the oil undergoing treatment. This soap may be used in proportions of from one pint to one quart per 42-gallon barrel of oil.

As for the method of treatment, I prefer to place the oil in an agitator of the normal type of a size proportionate to the batch being treated, add washing water, heat the mixture to about 130° F. by means of open steam while agitating with air in the usual manner, and then add a proper amount of caustic soda solution, ranging between the limits of ½ pound of dry caustic soda per barrel of oil when treating light colored oils, to 1 pound of dry caustic soda per 42-gallon barrel of oil when treating petrolatum. Agitation and heating is continued until a preferred top temperature is reached, which ranges from 160° F. in the case of light colored products such as mineral seal oil, to 180° F. in the case of heavier oils, petrolatums, and waxes. When this top temperature is reached, the proper amount of soap is added, the steam is shut off or cut to that amount necessary to maintain the required temperature, and the agitation with air is continued until the oil is cleaned up to a desired degree, after which the reagents are allowed to separate and are withdrawn from the oil.

I have found this reagent when properly used in company with alkalies to be capable of substantially removing odor and tastes from the heavy products of petroleum, such as mineral seal oils, light and heavy lubricants, petroleum, waxes and the like.

The usual equivalents, such as sodium carbonate, commercial soda ash, potassium salts, and the like may be substituted for the caustic soda used in the above examples.

In the following claims, the term "a demulsifying soap which is a product obtained by treating neutralized acid sludge 'liver' from petroleum refining with 'white water' from petroleum refining" is intended to refer to and define that product disclosed and claimed in United States Patent #1,742,623 to Turner, et al, as above noted.

I claim

1. The process of treating a petroleum product of the class consisting of petrolatum, neutral oils, waxes, and mineral seal oils for the removal therefrom of "distillate" odors and tastes, which comprises adding thereto a reagent consisting of an alkaline solution to which has been added a demulsifying soap which is the product obtained by treating neutralized acid sludge "liver" from petroleum refining with "white water" from petroleum refining, agitating the mixture while heating to a temperature not in excess of 180° F., and subsequently separating the reagent from the oil.

2. The process of removing objectionable "distillate" odor and taste from petroleum products of the class consisting of mineral seal oils, neutral oils, petrolatum, and waxes which comprises the steps of agitating the oil with air while heating to a temperature of approximately 130° F., adding caustic soda solution of from 3° to 10° Baumé strength in the proportion of from one-fourth pound to one pound of dry caustic soda per 42 gallon barrel of oil, continuing the agitation with heating until a temperature of 160° F. to 180° F. has been reached, adding, in proportions of from one-half to two gallons per barrel of oil, a 6° to 8° Baumé solution of a demulsifying soap which is the product obtained by treating neutralized acid sludge "liver" from petroleum refining with "white water" from petroleum refining, and continuing the agitation while maintaining the temperature until a satisfactory degree of odor and taste removal is obtained.

FRANK L. SMITH.